United States Patent
Folmer, Jr.

[15] 3,697,750
[45] Oct. 10, 1972

[54] METHOD FOR THE DETECTION OF CHANGE IN DENSITY OF A CARRIER GAS AND APPARATUS THEREFOR

[72] Inventor: Orville F. Folmer, Jr., Ponca City, Okla.

[73] Assignee: Continental Oil Company, Ponca City, Okla.

[22] Filed: Feb. 1, 1971

[21] Appl. No.: 111,514

[52] U.S. Cl. ............ 250/43.5 D, 73/30, 250/83.6 FT
[51] Int. Cl. ............................................. G01n 21/26
[58] Field of Search..250/43.5 FC, 43.5 D, 43.5 MR, 250/83.6 FT; 73/23.1, 30

[56] References Cited

UNITED STATES PATENTS

| | | |
|---|---|---|
| 2,728,219 | 12/1955 | Martin .................... 73/23.1 X |
| 3,117,439 | 1/1964 | Nerheim ...................... 73/30 |
| 3,357,232 | 12/1967 | Lauer ..................... 73/23.1 X |

Primary Examiner—John K. Corbin
Attorney—Joseph C. Kotarski, Henry H. Huth, Robert B. Coleman, Jr., Ronnie D. Wilson and John A. Feketis

[57] ABSTRACT

An improved method and apparatus for the detection of minute changes in density of a carrier gas. The improvement comprises the use of outlet tubes for tapping off of small samples of reference gas and measuring the change in flow rate of the reference gas through the outlet tubes.

4 Claims, 1 Drawing Figure

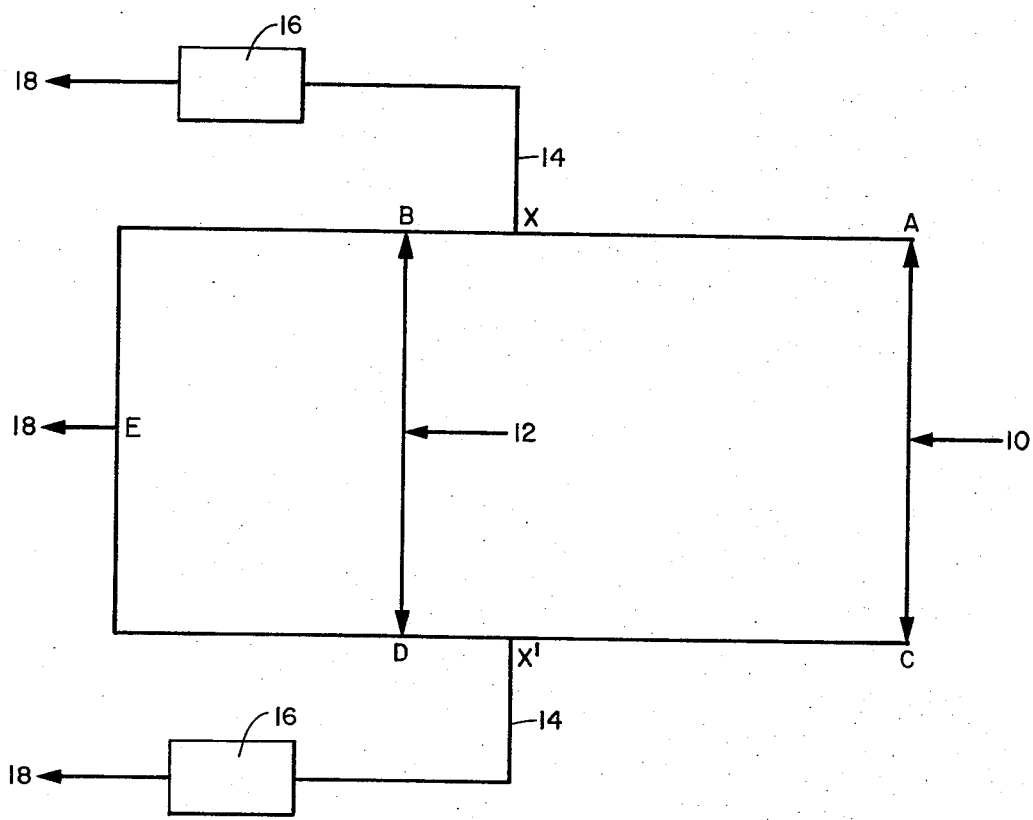

METHOD FOR THE DETECTION OF CHANGE IN DENSITY OF A CARRIER GAS AND APPARATUS THEREFOR This invention relates to an improved method and apparatus for detecting the change in density of a carrier gas. More particularly, this invention relates to an improved method and apparatus which employs outlet tubes for the passage of small samples of reference gas in order that the change in flow rate of said reference gas through said outlet tubes may be measured by means therefor to enable one to determine the change in density of a carrier gas.

Various techniques and methods have been previously disclosed for the detection of change in density of effluent and carrier gases. Such changes in density are normally caused by changes in composition and the various detection devices are useful in gas chromatography work as well as other gas work. Some of the gas density detection devices and techniques used previously are disclosed in U.S. Pat. Nos. 3,277,296; 3,082,618; 2,968,730 and 2,627,543.

A well-known detector of gas density changes for use in gas chromatography is described by A. G. Nerheim in 35, 11 Analytical Chemistry 1640 (Oct., 1963). Nerheim discloses a flowing gas bridge network which utilizes two vertical measuring columns, conduits connecting the columns, inlets for a reference gas of known density and a carrier gas into the respective columns, outlet for venting of the gases, and flowmeters for detecting changes in flow rates of the reference gas positioned at two points in the conduits connecting the measuring columns. As flowmeters, Nerheim discusses the use of the thermistor and filament type which measure the total flow of reference gas through the meters located in the conduits of the system. The sensitivity of Nerheim's gas density detector depends directly on the sensitivity of the flowmeter employed.

A major problem with previously used gas density detectors have been their complex design and less than adequate sensitivity when low molecular weight compounds have been involved.

Therefore, it is an object of the present invention to provide the art with a simple, highly sensitive gas density detector.

Another object of the present invention is to provide the art with an improved method for measuring the change in density of a carrier gas.

A further object is to provide the art with a method for detecting the change in density of a carrier gas which is from 100 to about 1,000 times more sensitive than any previously known device.

These and other objects of the present invention will become apparent from a reading of the following detailed description taken in connection with the accompanying diagram.

It has now been found that the objects of the present invention can be attained by, in a method for measuring a change in density of a carrier gas in a flowing gas bridge network, wherein the change in density of a carrier gas in a vertical column is determined by comparing the relative flow rates of a reference gas of a known density in another similar column at two detection points in said bridge network, sampling a small portion of said reference gas at the detection points to measure the change in flow rates of the samples in order to determine the change in density of the carrier gas.

The sole figure is a diagrammatic showing of the flow in the improved gas density balance apparatus of the present invention. The diagram shows the basic flow pattern in a gas density balance with the improvement of the present invention attached thereto.

The improved gas density detector as illustrated by the diagram has columns AC and BD mounted vertically with the conduits AB and CD horizontally located therebetween. Attached to conduits AB and CD are outlet tubes 14 at points X and X'. Outlet tubes 14 are further attached to gas ionization detectors 16 for the measurement of changes in flow through said outlet tubes.

In the operation of the improved gas density detector reference gas 10 enters column AC and divides part flowing up to A and part down to C. The other gas stream 12, a carrier gas i.e., an effluent gas from a chromatographic column, enters column BD and also divides part flowing up to B and part down to D. The divided streams 10 and 12 combine at points B and D and flow to point E and exit together at vent 18. Column BD is always filled with effluent gas stream 12, likewise column AC and conduits AB and CD are always filled with reference gas 10 flowing toward point E. The bridge network is balanced when only carrier gas 12 is flowing into column BD toward point E and reference gas 10 is flowing into column AC and conduits AB and CD thereby exerting a constant pressure at points B and D. When some compound of molecular weight greater than the carrier gas 12 elutes into column BD, the density of the gas 12 in column BD increases, the pressure at D increases and the flow of reference gas 10 from C to D is decreased. The pressure at B is decreased, and the flow of reference gas 10 from A to B is increased. Conversely, when a compound of molecular weight less than the carrier gas 12 elutes into column BD, the effect on the system is the opposite of that previously stated.

Therefore, the change in density of gas 12 in the column BD causes changes in the flow rates in conduits AB and CD by virtue of having changed the pressure at B and D. Note, the reference gas 10 flow rate is always so great that the flow is always from A to B and C to D; only reference gas 10 ever passes points X and X'.

A sample of reference gas 10 passing points X and X' is removed by outlet tubes 14 leading away from conduits AB and CD at points X and X'. The changes in pressure at points D and B will be reflected by changed flow rates of reference gas 10 through outlet tubes 14. These changes in flow rates of reference gas 10 in outlet tubes 14 are detected by various gas ionization detectors 16. After measurement the reference gas 10 is vented at points 18.

One skilled in the art can, by comparing the change in flow rates of reference gas 10 through outlet tubes 14 at two points X and X' in conjunction with detectors 16, measure changes in density of carrier gas 12 and thereby determine the change in molecular weight of carrier gas 12.

The improved apparatus of the present invention has an increased sensitivity of from about 100 to 1,000 times over previously known devices through the employment of outlet tubes leading to various types of ionization detectors for the bleeding off on a portion of the reference gas 10 stream at points X and X'.

The outlet tubes used for sampling of reference gas should be small in size relative to the conduits to which they are connected so as not to effect the flow rate of reference gas in the conduits. Alternatively, conventional means, such as a valve, may be provided for controlling the amount of reference gas sampled by the outlet tubes so as not to effect the flow rate of reference gas in the conduits. Only a negligible portion of the reference gas should be sampled through the outlet tubes in order that changes in pressure in the system are caused solely by a compound eluting into column BD of greater or lesser molecular weight than that of the carrier gas.

The flow rate of the reference gas through the outlet tubes should be within the linear dynamic range of the particular gas ionization detector employed to achieve an accurate measurement by the detector of the change in rate of flow through the outlet tubes. As stated above in connection with the controlling of the amount of reference gas flowing into the outlet tubes, the flow rate in the outlet tubes may be controlled either by the size of outlet tube selected or by other means for accomplishing the objective of having a flow rate of reference gas in the outlet tubes within the linear dynamic range of the particular gas ionization detector employed.

As stated previously, the flow rate of reference gas and carrier gas should be such that only reference gas is passing outlet points X and X' and in order to achieve this flow the flow rate of reference gas would have to be greater than the flow rate of carrier gas.

A suitable gas ionization detector to be employed in conjunction with the outlet tubes should be selected in regard to the kind of reference gas to be employed in the system. Such suitable detectors which are known in the art by various brand and tradenames include i.e., flame ionization detectors, electron capture detectors, Lovelock β-Argon Detector, β-Helium Detector, radioactivity detectors, and high voltage ionization detectors.

By way of illustration with reference to the sole diagram, in the operation of the improved gas density detector a nitrogen gas 10 containing 1 percent methane is introduced into column AC at a selected flow rate and divides part flowing up to A and part down to C. Nitrogen gas 12, from a chromatographic column for example, is introduced into column BD at a flow rate less than nitrogen-methane gas 10 and said gas 12 divides part flowing up to B and part down to D. The divided gas streams 10 and 12 combine at points B and D and flow to point E and exit together at vent 18. Column BD is filled with nitrogen gas 12 and likewise column AC and conduits AB and CD are filled with nitrogen-methane gas 10 flowing toward point E.

Upon the eluting of a compound, such as benzene, into column BD from, for example, a chromatographic column, the density of the gas in column BD increases, the pressure at D increases, and the flow of nitrogen-methane gas 10 from C to D decreases. The pressure at B increases, and the flow of nitrogen-methane gas 10 from A to B increases.

The change in density of the gas in column BD causes changes in the flow rate in conduits AB and CD by virtue of having changed the pressure at B and D.

A sample of the total amount of nitrogen-methane gas 10 flowing past points X and X' is removed by outlet tubes 14 leading away from conduits AB and CD at points X and X'. The tapped nitrogen-methane gas 10 in outlet tubes 14 is fed to a flame ionization detectors 16 at the rate of 0.01 ml/min and the changes in pressure at points D and B are reflected by changed flow rates of nitrogen-methane gas 10 in outlet tubes 14, which are measured by flame ionization detectors 16. After measurement by flame ionization detectors 16 the nitrogen-methane gas 10 is vented at points 18.

The change in molecular weight of the nitrogen gas 12 by the eluting benzene is thus determined by comparing the detected change in flow rates of nitrogen-methane gas 10 through outlet tubes 14.

Since the change in flow rate of reference gas 10 in outlet tubes 14 reflect the changes in pressure at points B and D caused by the eluting compound into column BD, the positions X and X' of outlet tubes 14 along conduits AB and CD are critical to the sensitivity of the measurement of said changes. Positions X and X' for outlet tubes 14 should be as near to points B and D as possible without being so close as to allow carrier gas 12 to back into and flow through outlet tubes 14. The more distance between points B and D and positions X and X' for outlet tubes 14 along conduits AB and CD, the less sensitive the measurement will be of changes in flow rate in outlet tubes 14 of reference gas 10, which are a reflection of pressure changes at points B and D.

It should be noted that although the preferred embodiment of the present invention has been illustrated and described in reference to gases only, the present invention is also applicable to liquids with minor changes in the apparatus, such as, means for vaporizing the liquid prior to introduction into a gas ionization detector or the use of liquid detectors.

Although a preferred embodiment of the invention has been illustrated in the diagram and described herein, in order to provide an example of the practice of the invention, it is to be understood that various changes and innovations can be made in the described apparatus without departing from the spirit and scope of the invention. Innovations and changes of this type are deemed to be encompassed within the spirit and scope of the invention.

Having thus described my invention, I claim:

1. An improved apparatus for determining the change in density of a carrier gas in a flowing gas bridge network, wherein said network consists of measuring columns, conduits connecting said columns, inlets for a reference gas of known density and a carrier gas, means for venting of gases, and means for detecting changes in flow rates of said reference gas positioned in said conduits connecting said measuring columns, the improvement comprising the use of means for tapping off a small portion of said reference gas flowing through said conduits connecting said measuring columns, said means positioned along said conduits in order to measure the change in flow rates of said reference gas through said means by means provided therefor.

2. The improvement of claim 1 wherein said means for tapping off a portion of said reference gas is an outlet tube.

3. The improvement of claim 1 wherein said means for measuring changes in flow rates of said reference gas through said outlet tubes are gas ionization detectors.

4. In a method for measuring a change in density of a carrier gas in a flowing gas bridge network, wherein the change in density of a carrier gas in a vertical column is determined by comparing the relative flow rates of a reference gas of a known density in another similar column at two detection points in said bridge network, the improvement comprising sampling a small portion of said reference gas at said detection points to measure the flow rates of said samples in order to determine the change in density of said carrier gas.

* * * * *